United States Patent [19]
Munz et al.

[11] Patent Number: 6,111,380
[45] Date of Patent: Aug. 29, 2000

[54] SYSTEM FOR DETECTING ABUTMENT AND BLOCKING IN A STEPPED MOTOR

[75] Inventors: Juergen Munz, Leinfelden; Harald Eisenhardt, Rutesheim, both of Germany

[73] Assignee: Robert Bosch GmbH, Stuttgart, Germany

[21] Appl. No.: 09/155,461

[22] PCT Filed: Mar. 4, 1997

[86] PCT No.: PCT/DE97/00392

§ 371 Date: Mar. 2, 1999

§ 102(e) Date: Mar. 2, 1999

[87] PCT Pub. No.: WO97/37425

PCT Pub. Date: Oct. 9, 1997

[30] Foreign Application Priority Data

Mar. 29, 1996 [DE] Germany .......................... 196 12 597

[51] Int. Cl.[7] .................................................. G05B 5/00
[52] U.S. Cl. .......................... 318/474; 318/625; 318/696; 318/460; 318/466; 318/254; 318/138; 318/439
[58] Field of Search .................................. 318/685, 696, 318/474, 138, 254, 439, 460, 466

[56] References Cited

U.S. PATENT DOCUMENTS 3,732,480  5/1973  Hendrickson et al. .................. 318/696
5,327,053  7/1994  Mann et al. .

FOREIGN PATENT DOCUMENTS

| 0 382 887 | 8/1990 | European Pat. Off. . |
| 24 47 673 | 4/1976 | Germany . |
| 39 21 462 | 8/1990 | Germany . |
| 44 19 813 | 12/1995 | Germany . |
| 2 076 567 | 12/1981 | United Kingdom . |

*Primary Examiner*—Karen Masih
*Attorney, Agent, or Firm*—Kenyon & Kenyon

[57] ABSTRACT

A stop and jamming detection system in a stepping motor determines a parameter from the profile of an instantaneous motor variable and compares it to a reference value. A signal for the stop and jamming detection system is generated therefrom. Provided for this purpose is an analysis circuit which detects, as the instantaneous motor variable, the voltage that is induced in at least one unenergized winding of the stepping motor and is brought about by an energized winding of the stepping motor, and analyzes it as to whether the stepping motor is jammed or movable. In the analysis by the analysis circuit, a decision is made as to a hard or an elastic jam. With a hard jam, the stationary armature means that no voltage is induced, while with an elastic jam, because the step is not completed, the recoil of the armature into its original position induces an opposite-phase voltage peak which is detected.

7 Claims, 3 Drawing Sheets

6,111,380

SYSTEM FOR DETECTING ABUTMENT AND BLOCKING IN A STEPPED MOTOR

FIELD OF THE INVENTION

The invention proceeds from a stop and jamming detection system in a stepping motor, in which a signal that is significant for the stop and jamming detection system is determined from the profile of an instantaneous motor variable.

BACKGROUND INFORMATION

German Patent No. 44 19 813 A1 describes an apparatus for operating an electric motor, stepping motor, or commutator motor, which analyzes an overload or jamming of the drive system for which the electric motor is the power source based on a parameter of a current flowing through the electric motor. The parameter can be determined either within a time interval which still lies within the activation operation after a starting time of the electric motor, or at a predefined sampling time which lags the starting point by a certain delay time. The parameter used for the current being analyzed can be the current amplitude, the change in current, or a current difference, which is evaluated as the signal for the stop and jamming detection system. It is essential in this conventional apparatus that the electric motor be at least approximately current-free at the beginning of the aforesaid starting point, and that the time interval or sampling time occur before steady-state motor current is reached.

SUMMARY OF THE INVENTION

In accordance with the present invention, a stop and jamming detection system in an electric motor is provided which analyzes voltage. Thus, the system according to the present invention is more economical than conventional systems.

According to the present invention, an analysis circuit is provided which detects the voltage that is induced in at least one unenergized winding of the stepping motor and is brought about by an energized winding of the stepping motor, and analyzes it as to whether the motor is jammed or movable.

In advantageous embodiments of the present invention, it is possible to perform the analysis by the analysis circuit with regard to a hard jam or an elastic jam.

According to an advantageous embodiment of the present invention, detection of a hard jam is accomplished with the stepping motor at a standstill and in a test step in which one winding of the stepping motor is energized, and the voltage possibly induced in the other winding of the stepping motor, which is substantially zero in the case of a hard jam, is analyzed.

According to another advantageous embodiment of the present invention, the analysis circuit for detection of an elastic jam detects peaks in the induced voltage profile in the unenergized winding. These peaks can be both negative and positive. In an advantageous development of this embodiment of the present invention, the peaks are detected as an elastic jam when a specific threshold is exceeded.

In a particularly advantageous embodiment development, detection of an elastic jam is accomplished with the stepping motor running in a defined slow fashion.

According to an advantageous embodiment of the present invention, the analysis circuit provided for detection of an elastic jam contains a separate comparator for each winding of the stepping motor, the outputs of the comparators each being guided via a diode to a shared. A signal is present at that output when a voltage peak exceeding a threshold occurs in the induced voltages in one of the windings of the stepping motor.

According to another advantageous embodiment of the present invention, the analysis circuit for detection of a hard jam includes a comparator for any arbitrary winding of the stepping motor, to which voltage peaks conveyed via a diode and a voltage divider can be delivered, and in which the comparator is guided directly to the output and emits an output signal if a correspondingly high voltage peak was induced.

A stop detection system according to the present invention (referring here to jamming as a result of the mechanical stop, increases the convenience of the system in which it is applied, since the noise generated by the stepping motor running against a stop is reduced. The stop detection system can evaluate the number of steps from stop to stop in stepping motors automatically and without additional outlay.

A jamming detection system according to the present invention makes possible the detection of a temporary jam, the use of suitable activation strategies to correct the position of the stepping motor, minimization of the effects and a diagnostic output in the event of faults, and appropriate application of fault handling concepts. The overall convenience and flexibility of the system are thereby substantially improved.

DETAILED DESCRIPTION

Figure 1:
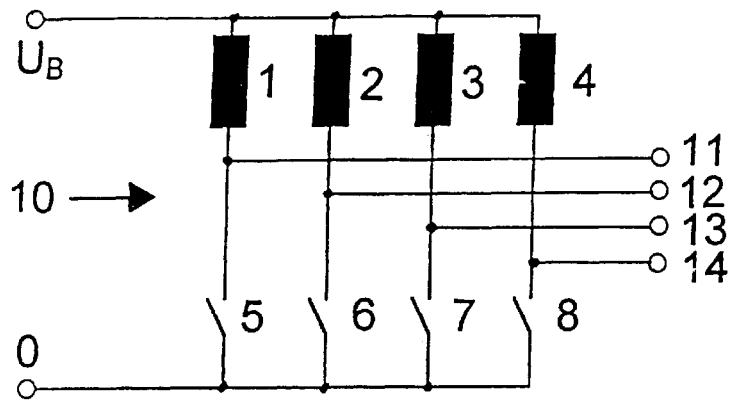
FIG. 1 schematically shows a block diagram of a stepping motor having four windings and corresponding switches.

FIG. 1 shows a block diagram of a stepping motor. Stepping motor 10 contains four windings 1, 2, 3, and 4, each of which is connected in series with a pertinent switch 5, 6, 7, and 8 between a positive supply voltage $U_B$, for example of the battery of a motor vehicle, and ground potential 0. Provided between each winding and the pertinent switch is a tapping point 11, 12, 13, 14 which serves for voltage monitoring of the respective windings 1 through 4 for the stop and jamming detection system according to the present invention. By controlled closing and opening of switches 5 through 8, the pertinent windings 1 through 4 of stepping motor 10 are connected to supply voltage $U_B$ or disconnected from it, and thus energized or unenergized.

Stepping motor 10 depicted in FIG. 1, along with switches 5 through 8 arranged between ground potential 0 and windings 1 through 4, constitute a stepping motor activation system with ground switches or low-side drivers. The discussion below concerning the time diagrams and the various analyses refers to this type of activation. Of course, in accordance with the present invention, an activation system with high-side switches is also possible.

Figure 4:
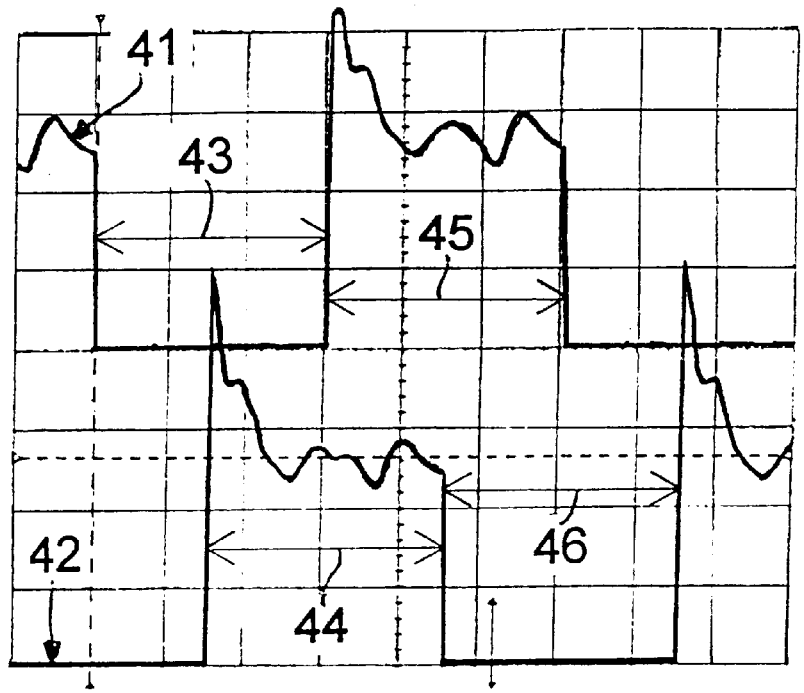
FIG. 4 shows a time diagram which indicates the correlation between two winding pairs, in which one winding in each case is alternately energized and unenergized.

The time diagram depicted in FIG. 4 shows the correlation between two winding pairs, of which one winding in each case is alternately energized and unenergized. The depiction shows the voltage profile as a function of time. In the upper portion of the time diagram, 41 represents the voltage profile of, for example, a first winding pair consisting of windings 1 and 3, and in the lower portion of the time diagram, 42 represents the voltage profile of, for example, a second winding pair consisting of windings 2 and 4. A current flow is present during time period 43 in voltage profile 41, since the voltage when the switch is closed is substantially zero. In the example shown, this can be, for example a closed switch 5 with an energized winding 1. In the immediately subsequent time period 45, switch 5 is opened and winding 1 is unenergized. With an offset of 90 degrees electrically, such is also the case in voltage profile 42 for the second winding pair constituted by windings 2 and 4. For example, in time period 44 switch 6 is closed and winding 2 is therefore energized. In the immediately subsequent time period 45, switch 6 is then opened and winding 2 is unenergized. The conditions are the same for the other two switches 7 and 8 and their pertinent windings 3 and 4, and therefore do not require further explanation.

The stop and jamming detection system according to the present invention is based on analysis of the induced voltage in at least one unenergized winding of the stepping motor. In the case of a freely movable stepping motor, the movement of the armature results in an induced voltage in unenergized windings. This behavior is evident from the depiction in the time diagram of FIG. 4.

In the stop and jamming detection system according to the present invention, analysis is accomplished in terms of a hard and an elastic jam. When a hard jam is present, the armature does not move thus, a suitable winding is energized while the stepping motor is at a standstill. When an elastic jam is present, the armature cannot completely perform a step. The stepping motor is deflected and recoils back into its original position. This oscillation leads to an induced voltage in the unenergized windings. This is depicted in the time diagram of FIG. 5. An elastic jam is the instance which occurs by far the most often in practice, since, because of the mechanical transfer elements attached to the stepping motor—such as gear drives, linkages, and flap valves or other elements being displaced—the overall system possesses a certain elasticity.

Figure 2:
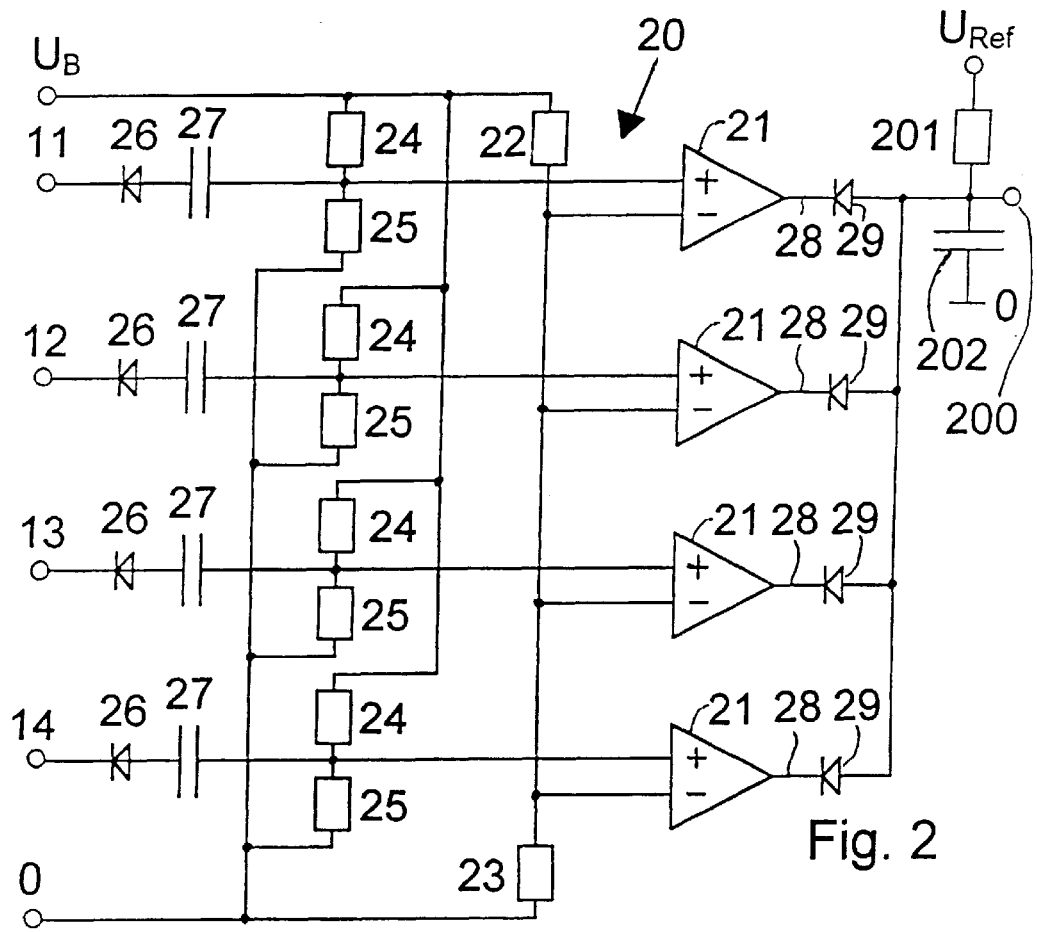
FIG. 2 schematically shows a block diagram of one possible analysis circuit for detecting an elastic jam in accordance with the present invention.

Referring to FIG. 2, one possible analysis circuit 20 for detecting an elastic jam of a stepping motor 10 will be explained below in conjunction with the time diagram depicted in FIG. 5.

Figure 5:
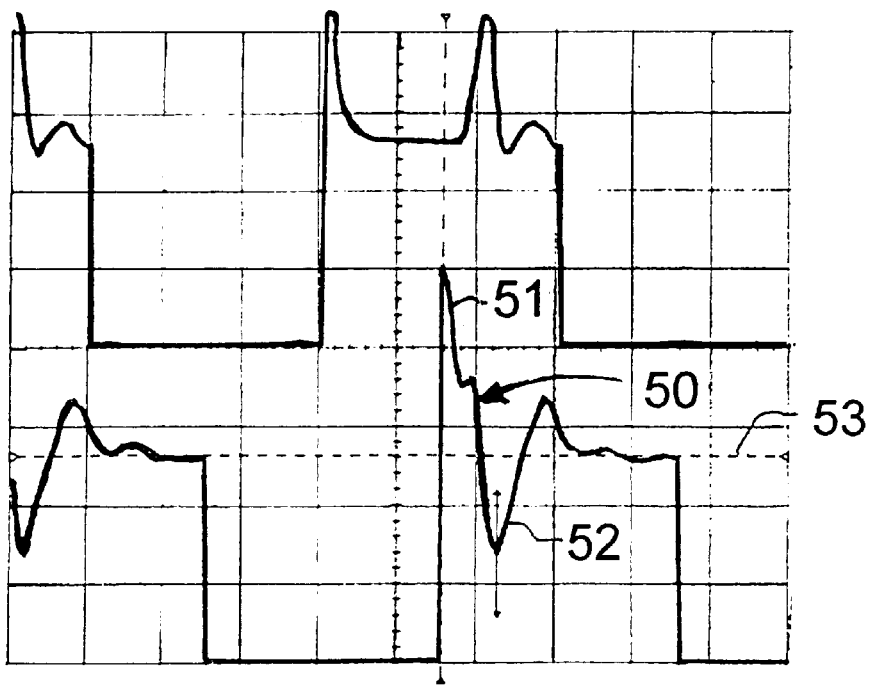
FIG. 5 shows a time diagram which, in a depiction similar to FIG. 4, shows the voltage profile in the unenergized winding when an elastic jam is present.

According to the present invention, analysis circuit 20 detects in particular voltage peaks 51 and 52 in the induced voltage profile 50 in the unenergized winding, as depicted in FIG. 5. If voltage peaks 51 and 52 exceed a specific threshold, analysis circuit 20 detects elastic jamming and generates a corresponding output signal. This output signal can be conveyed as an external interrupt to a microcontroller in a control circuit (not depicted) of stepping motor 10 for further processing.

Voltage peaks 51 and 52 have different polarities, as is readily apparent with respect to the pertinent zero line 53 in FIG. 5. This polarity can be utilized in suitable fashion in analysis circuit 20. It is moreover of particular advantage to perform the detection when the stepping motor is running in a defined slow fashion. The need for the analysis circuit to have high time sensitivity is then eliminated, and more economical components can be used.

Analysis circuit 20 depicted in FIG. 2 includes four identical branches for the four winding tapping points 11 through 14 of FIG. 1. In each branch, a separate comparator 21 is provided for each winding. Each comparator has a noninverting input labeled "+" and an inverting input labeled "−". The inverting inputs of comparators 21 are connected to a specific potential via a voltage divider which includes resistors 22 and 23 and is located between supply voltage $U_B$. and ground potential 0. In addition, the noninverting inputs of comparators 21 are connected to a specific potential via a voltage divider which includes resistors 24 and 25 and is located between supply voltage $U_B$ and ground potential 0. Located between each input 11 through 14 of analysis circuit 20 and each noninverting input of each comparator 21 is the series circuit made up of a diode 26 and a capacitor 27. In the exemplary embodiment depicted, diode 26 is polarized so that only negative voltages, i.e. for example voltage peak 52 as shown in FIG. 5, and via capacitor 27 only edges, arrive at the noninverting input (labeled "+") of comparator 21.

Voltage divider 22/23 defines the threshold for comparator 21 at the inverting input labeled "−". Voltage divider 24/25 ensures that only voltage peaks 52 which exceed a certain potential arrive at the noninverting input. The voltage at the inverting inputs of comparators 21 is selected via voltage divider 22/23 in such a way that it is lower than the voltage at the noninverting inputs. Only negative voltages are coupled through diodes 26, and only edges through capacitors 27, to the noninverting inputs of comparators 21. Since the taps of the two voltage dividers 22/23 and 24/25 each shift in the same ratio with the (possibly fluctuating) supply voltage $U_B$, the output signal present at comparator 21 is independent of fluctuations in the supply voltage.

Each comparator 21 has an output 28 which is guided via a negatively polarized diode 29 to an output 200 shared by all comparators 21. At this shared output 200, a further resistor 201 is connected to a reference voltage source $U_{Ref}$, and a capacitor 202 is connected to ground potential 0. As described above, shared output 200 makes a signal available if voltage peaks 52 in the induced voltage profile 50 of an unenergized winding exceed a reference value, and elastic jamming is thus detected. The output signal appearing at shared output 200 and indicating the jamming can be conveyed as an external interrupt to the microcontroller of the control circuit, and there processed further as appropriate.

Analysis to detect an elastic jam makes use of the fact that the recoil of the armature in the unenergized windings induces an opposite-phase voltage. The voltage drops below the voltage of the inverting input at at least one noninverting input of a comparator 21. This comparator output switches. An interrupt can thus be triggered, and jamming of the stepping motor can be detected. If the stepping motor is movable, however, the voltage at the noninverting inputs of comparators 21 remains higher than at the inverting inputs.

Figure 3:
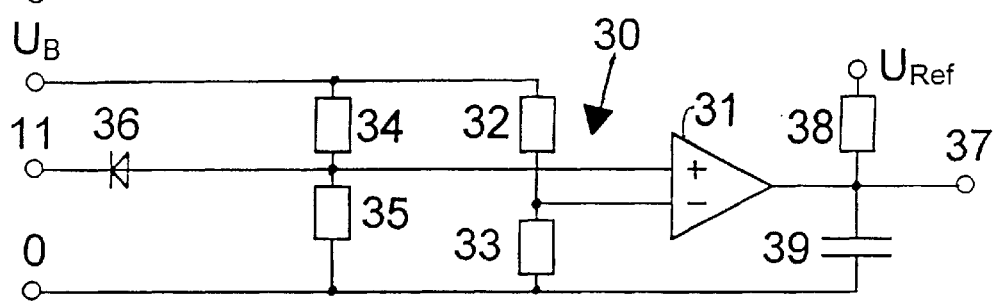
FIG. 3 schematically shows a block diagram of one possible analysis circuit for detecting a hard jam in accordance with the present invention.

Referring to FIG. 3, one possible analysis circuit 30 for detecting a hard jam of a stepping motor 10 is explained below.

A comparator 31 is provided in any desired branch, for example having winding 1 and tapping point 11 between winding 1 and the pertinent switch 5 which serves as input for analysis circuit 30. Comparator 31 has a noninverting input labeled "+" and an inverting input labeled "−". The inverting input of comparator 31 is connected to a specific potential via a voltage divider which consists of resistors 32 and 33 and is located between supply voltage $U_B$. and ground potential 0. In addition, the noninverting input of comparator 31 is connected to a specific potential via a voltage divider which consists of resistors 34 and 35 and is located between supply voltage $U_B$ and ground potential 0. A diode 36 is located between input 11 of analysis circuit 30 and noninverting input of comparator 31. In the exemplary embodiment depicted, diode 36 is polarized so that only negative edges, i.e. negative voltage peaks, arrive at the noninverting input (labeled "+") of comparator 31. Voltage divider 32/33 defines the threshold for comparator 31 at the inverting input (labeled "−"). Voltage divider 34/35 ensures that only voltage peaks which exceed a certain potential arrive at the noninverting input. Since the taps of the two voltage dividers 32/33 and 34/35 each shift in the same ratio with the (possibly fluctuating) supply voltage $U_B$, the output signal present at comparator 31 is independent of fluctuations in the supply voltage.

In the analysis to detect a hard jam, when the position of stepping motor 10 is known, e.g., by the fact that winding 1 is energized, three-eighths of a step can be performed. If the stepping motor is movable, an induced voltage with a 180-degree phase shift results in the unenergized winding pair. The voltage at input 11 (known via the stopped position of the stepping motor) for the noninverting input of the comparator drops below the voltage at the inverting input, and the output switches. Because no voltage is induced when the stepping motor is hard-jammed, however, comparator 31 does not switch.

Figure 6:
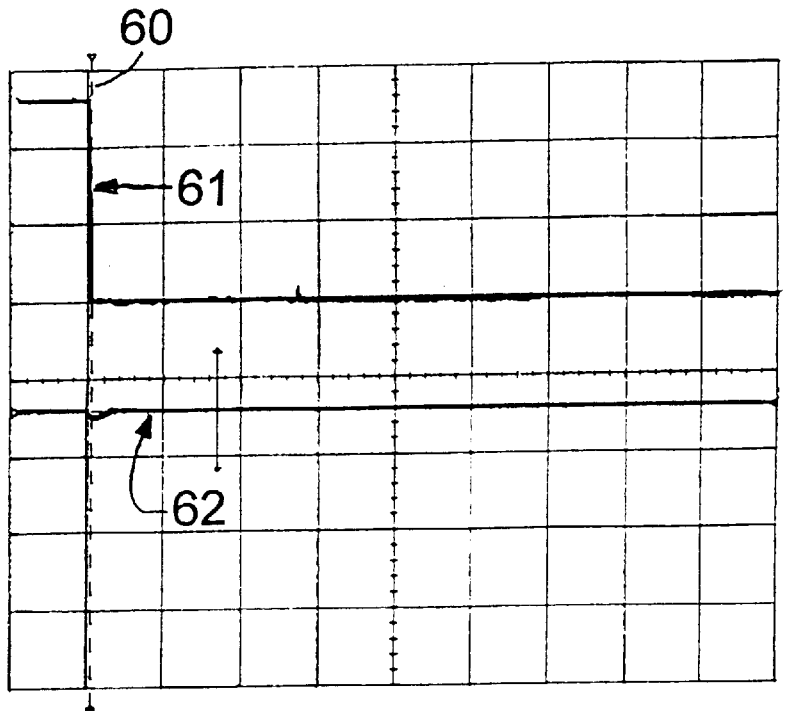
FIG. 6 shows a time diagram which indicates the correlation between the current profile in an energized winding and the induced voltage in an unenergized winding during a test step for determination of a hard jam.

FIG. 6 depicts, with reference to a time diagram, the correlation between the current profile in an energized winding and the induced voltage in an unenergized winding during a test step to identify a jam. The upper portion depicts voltage profile 61 which provides for current flow through a specific winding from high voltage before to low voltage after a time 60. The lower portion of the time diagram depicts voltage profile 62 in an unenergized winding of the other winding pair. No change in voltage profile 62 is observed before and after time 60. Since no voltage is induced in unenergized windings in the event of a hard jam, since the armature is stationary, a hard jam is, therefore, present.

Figure 7:
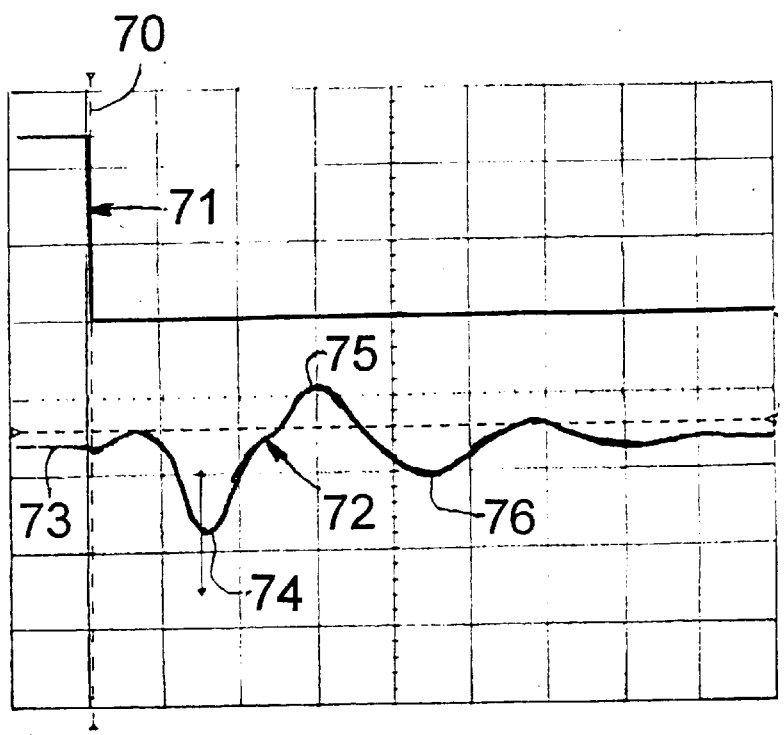
FIG. 7 shows a time diagram which indicates the correlation between the current profile in an energized winding and the induced voltage in an unenergized winding during a test step for determination of an elastic jam.

FIG. 7 depicts, with reference to a time diagram, the correlation between the current profile in a energized winding and the induced voltage in an unenergized winding during a further test step to identify a jam. The upper portion depicts the voltage profile 71 which provides for current flow through a specific winding from high voltage before to low voltage after a time 70. The lower portion of the time diagram depicts voltage profile 72 in an unenergized winding of the other winding pair. Before time 70, voltage profile 72 is almost constant at zero. A considerable change in voltage profile 72 is apparent, however, after time 70. A relatively large negative voltage peak 74 occurs, then a smaller-amplitude voltage peak 75, and once again a lower-amplitude negative voltage peak 76, until the induced voltage decays. A voltage can be induced only if the armature of the stepping motor moves. The recoil of the armature prior to completion of the step causes an oscillation and thus an induced negative voltage. An elastic jam is, thus, present.

With the stop and jamming detection system configured according to the present invention, the analysis of the induced voltage and the analysis circuits thereby made possible eliminate any need to worry about voltage or temperature dependences. In addition, the stop and jamming detection system configured according to the present invention places no particular demands on any microcontroller that might be used in the control circuit. The stop and jamming detection system configured according to the present invention eliminates the noise generated by the stepping motor running against a stop. Stepping faults which occur while the stepping motor is running are detected in the end stops. The reference position of the stepping motor can be equalized with the actual position. The actual position does not need to be stored, since the stop and jamming detection system configured according to the present invention makes it possible to determine the position of the stepping motor with little mechanical stress and with no calibration noise.

We claim:

1. A stop and jamming detection system in a stepping motor, the stepping motor including windings, comprising:
   an analysis circuit detecting a voltage induced in at least one unenergized winding of the windings of the stepping motor, the voltage being induced as a function of an energized winding of the windings of the stepping motor, the analysis circuit comparing the detected voltage to a reference value and determining if the stepping motor is in a jammed state as a function of the comparison, the jammed state being an elastic jam in which the stepping motor cannot complete a step and oscillates.

2. The stop and jamming detection system according to claim 1, wherein the analysis circuit detects a peak in a profile of the detected voltage.

3. The stop and jamming detection system according to claim 2, wherein the analysis circuit determines that the stepping motor is in a jammed state if the detected peak is greater than a predetermined threshold value.

4. The stop and jamming detection system according to claim 1 wherein the system operates to detect the jammed state when the stepping motor is running in a slow mode.

5. The stop and jamming detection system, according to claim 1, wherein the analysis circuit includes a separate comparator for each of the windings of the stepping motor, each separate comparator including an inverting input, a noninverting input and an output, the induced voltage being conveyed to each noninverting input via a diode and a capacitor, each noninverting input of each separate comparator coupled to a first voltage divider, the first voltage divider coupled between a voltage supply and a ground potential, the inverting input of each separate comparator coupled to a second voltage divider, the second voltage divider coupled between the supply voltage and the ground potential, the output of each separate comparator being guided via a diode to a shared output, wherein a signal at the shared output is present when a voltage peak exceeding a predetermined reference voltage at the shared output occurs in an induced voltage in one of the windings of the stepping motor.

6. The stop and jamming detection system according to claim 1, wherein the analysis circuit includes an arrangement determining if the stepping motor is in a hard jam while the stepping motor is in a standstill state, the analysis circuit determining that the stepping motor is in the hard jam if a first one of the windings is energized and a voltage in a second one of the windings is substantially zero.

7. The stop and jamming detection system according to claim 6, wherein the arrangement determining if the stepping motor is in a hard jam includes a comparator associated with one of the windings of the stepping motor, the comparator receiving voltage peaks via a diode and a voltage divider, an output of the comparator coupled to an output of the stop and jamming system, the output of the stop and jamming system emitting an output signal if at least one of the voltage peaks is higher than a predetermined threshold value.

* * * * *